Patented Dec. 7, 1937

2,101,097

UNITED STATES PATENT OFFICE 2,101,097

PRODUCTS FOR RENDERING THE URINE BACTERIOSTATIC

Theodore H. Rider, Mariemont, and Robert Shelton and John Haynes, Cincinnati, Ohio, assignors to The Wm. S. Merrell Company, Cincinnati, Ohio, a corporation of Ohio No Drawing. Application July 26, 1934, Serial No. 737,102

8 Claims. (Cl. 167—65)

The present invention relates to products for rendering the urine bacteriostatic and has for an object the provision of products that are very effective and which are free from the objections attending the use of presently known and used products, namely, high toxicity, relatively great instability and undesirable side effects.

Another object of the invention is to provide a novel class of products that are fully as satisfactory in the production of ketone bodies in the urine as any heretofore known and which are free from objections encountered in the use of the latter.

Another object is to provide products of this improved character that can be used therapeutically both to support a full ketogenic diet in cases wherein the diet alone is incompletely effective and also in conjunction with a modified ketogenic diet, thus making it possible for the physician to more certainly render the urine bacteriostatic in patients who are not hospitalized and whose diet therefore cannot be absolutely controlled.

These and other objects are attained by the means herein fully set forth in the following specification.

It has been rather widely recognized in recent years that the commonly used and so-called urinary antiseptics are of questionable value in a sizable percentage of cases and that the use of the so-called ketogenic diet has given results which are statistically more favorable. It is the common understanding at the present time that the ketogenic diet renders urine bacteriostatic, when it does, by causing an imperfect metabolic disposal of the decomposition products of fats with the resultant excretion of levo beta hydroxybutyric acid in the urine. The bacteriostatic activity of such urine is attributed to the levo beta hydroxybutyric acid content, and to concomitant acidity.

A fair number of clinical cases are resistant to the effects of the ketogenic diet when used as such, that is, the diet alone is not sufficient to render the urine bacteriostatic. Furthermore, it is deemed desirable, if possible, to obviate the necessity of a strictly ketogenic diet. It has been noted that the oral administration of hydroxybutyric acid aids in increasing the quantity of levo hydroxybutyric acid in the urine. The only hydroxybutyric acid available generally is the racemic form and when this is administered orally the dextro-isomer appears to be completely decomposed and therefore to be of no value. The oral administration, therefore, of levo hydroxybutyric acid would be sufficient were it not for the fact that this product would be difficult and expensive to obtain in a form suitable for administration. It has been experimentally shown and recorded that certain other products when administered orally result in the excretion of levo hydroxybutyric acid in the urine. Outstanding among these products is aceto acetic acid; and other acids to which have been attributed like effect are butyric, crotonic, phenylbutyric, isovaleric, and valeric acids.

In the case of aceto acetic acid there are several objections to its medical use. These are primarily its relatively high toxicity, its relatively great instability and the undesirable side effects of administration such as nausea, vomiting, gastric irritation, etc. On the other hand, aceto acetic acid has the supposed benefits of being more or less quantitatively converted by the animal body into levo hydroxybutyric acid.

The inventors herein have discovered that esters of these acids may be administered with much less objectionable side reaction than the acids themselves and that the esters are fully as satisfactory from the view point of production of ketone bodies in the urine. For various reasons, including economy, ethyl aceto acetate is at present conceived to be the preferred product for medicinal use although the invention is not to be considered limited to this one product. The inventors realize that all simple esters, such as the esters of aliphatic alcohols, mono-, di-, and tri hydric, and the esters of substituted alcohols, such as benzyl alcohol would give approximately equivalent results therapeutically provided only that the alcohol used in preparing the ester had no objectionable physiological effect in itself.

Experimental work in the laboratory and clinic has shown that ethyl aceto acetate is less toxic than hydroxybutyric acid or aceto acetic acid and that it can be administered, preferably enclosed in soft gelatin capsules, in sufficient dose to render the urine bacteriostatic, without toxic symptoms or other deleterious side effects. The product can be used therapeutically both to support a full ketogenic diet in cases in which such diet alone is incompletely effective and also in conjunction with a modified ketogenic diet, making it possible for the physician to more certainly render the urine bacteriostatic in patients who are not hospitalized and whose diet therefore cannot be absolutely governed. An additional advantage of the therapeutic use of ethyl aceto acetate is the fact that clinical results indicate that it aids in rendering or maintaining the urine at a sufficient degree of acidity to allow the full bacteriostatic effect of the acetone bodies excreted.

While ethyl acetoacetate is at present conceived to be the preferred product, we have also demonstrated that a variety of esters as described of this and the other acids specified do have similar qualitative properties. Particularly worthy of mention are the esters of beta hydroxybutyric acid. The mixed esters of the racemic acid are easily prepared and are therapeutically active. The esters of the levo hydroxybutyric acid would be preferred to the mixed esters of the racemic acid but cannot be prepared so economically. Following the administration of any of these esters it is our belief that the resultant bacteriostatic effect in the urine is due to beta hydroxybutyric acid. It is not inconceivable, however, that in some of these cases at least, particularly following the administration of the esters of butyric, crotonic, phenylbutyric, iso-valeric, and valeric acids, that other products which would fall into the broad classification of ketone bodies might be excreted and active as bacteriostatic agents.

The claims, therefore, are not to be considered as limited to products for the production of beta hydroxybutyric acid but only to the broader statement that bacteriostatic compounds are eliminated following their administration.

Any of the known modes may be used in the preparation of the esters of those simple organic acids that upon oral administration, cause the excretion of acetone bodies in the urine. They are preferably enclosed in dosage quantity in soft gelatine capsules for oral administration. The product has been found clinically to be well tolerated in doses of two (2) grams and it has been further demonstrated that smaller doses have produced a definite secretion of acetone bodies in the urine in the same day as administered even without the concomitant use of the ketogenic diet.

What is claimed is:

1. A therapeutic agent for oral administration for rendering the urine bacteriostatic comprising the esters of those simple organic acids selected from the group consisting of aceto acetic acid, hydroxy-butyric acid, butyric acid, phenol butyric acid, valeric acid, iso-valeric acid and crotonic acid, the administration of which acids is known to cause the excretion of acetone bodies in the urine when administered as acids.

2. A therapeutic agent for rendering the urine bacteriostatic consisting of the esters of aceto acetic acid.

3. A therapeutic agent for rendering the urine bacteriostatic comprising the esters of hydroxybutyric acid.

4. A therapeutic agent for oral administration for producing ketosis of desired grade comprising the esters of simple organic acids selected from the group of acids which when administered as acids are known to ordinarily effect ketonuria following their administration.

5. A therapeutic agent for oral administration for use in cases wherein ketosis of desired grade is required comprising ethyl aceto acetate.

6. A therapeutic agent for rendering the urine bacteriostatic consisting of the esters of beta-hydroxybutyric acid.

7. A therapeutic agent for rendering the urine bacteriostatic consisting of beta-hydroxybutyric acid ethyl ester.

8. A therapeutic agent for oral administration for use in producing ketosis of desired degree comprising encapsulated dosage quantities of ethyl aceto-acetic acid.

THEODORE H. RIDER.
ROBERT SHELTON.
JOHN HAYNES.